United States Patent [19]

Harder et al.

[11] Patent Number: 4,532,689

[45] Date of Patent: Aug. 6, 1985

[54] MACHINE FOR REMOVING ELECTRIC TRACTION MOTORS FROM WHEEL SPINDLES

[75] Inventors: John O. Harder, Maryland Heights; Doyle W. McCandless, St. Louis; Michael W. Peterson, Maryland Heights, all of Mo.

[73] Assignee: John Harder & Co., St. Louis, Mo.

[21] Appl. No.: 428,168

[22] Filed: Sep. 29, 1982

[51] Int. Cl.³ .............................................. H02K 15/16
[52] U.S. Cl. .................................. 29/426.5; 29/732; 29/824; 29/252
[58] Field of Search ................ 29/252, 253, 244, 262, 29/267, 732, 426.5, 823, 824

[56] References Cited

U.S. PATENT DOCUMENTS

| | | | |
|---|---|---|---|
| 1,429,567 | 9/1922 | Carlisle | 29/262 |
| 1,778,802 | 10/1930 | Howell | 29/262 |
| 2,036,665 | 4/1936 | White et al. | 29/262 X |
| 3,069,761 | 12/1962 | Sommer | 29/252 |
| 4,157,613 | 6/1979 | Morrow | 29/824 X |

Primary Examiner—Howard N. Goldberg
Assistant Examiner—Timothy V. Eley

Attorney, Agent, or Firm—Gravely, Lieder & Woodruff

[57] ABSTRACT

An extracting machine for withdrawing an electric traction motor from a wheel spindle in which that motor is normally positioned, includes a frame, a carriage mounted upon the frame to move forwardly and rearwardly, a head mounted on the carriage such that it can be rotated, and arms mounted upon the head such that they can be spread apart or moved together. The frame mounts upon the tines of a fork lift truck which is maneuvered to locate the extracting machine opposite to the end of the spindle. Once the motor has been jacked a few inches out of the spindle, the head is rotated so that the free ends of the arms will fit into the motor, whereupon the carriage is advanced on the frame until stops on the arms bear against the end of the motor. This positions pads that are upon the arms opposite to an inwardly presented machined surface in the motor. Then the arms are spread apart, enabling the pads at their free ends to tightly grip the machined surface in the motor. Finally, the carriage is moved rearwardly over the frame, and as it retracts the arms withdraw the motor from the spindle. The arms further support the motor once it is completely free of the spindle.

1 Claim, 7 Drawing Figures

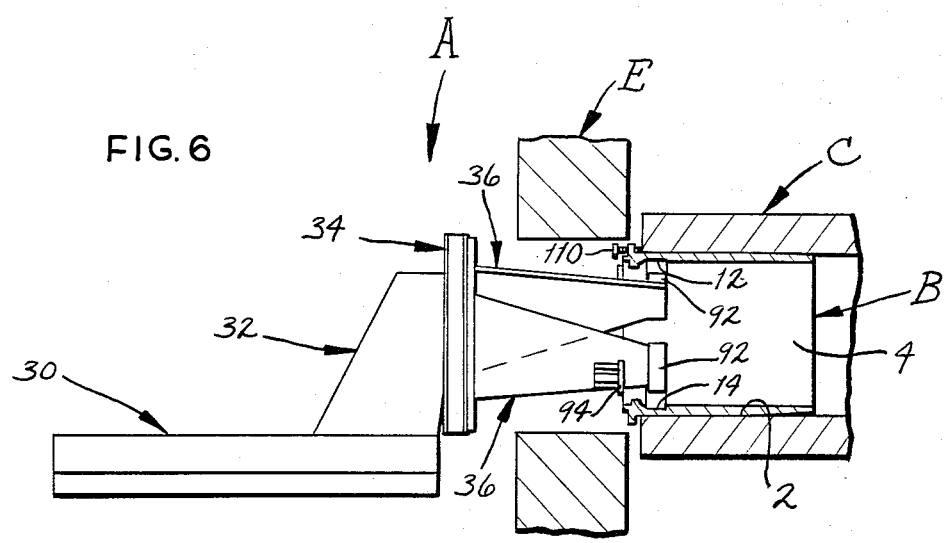
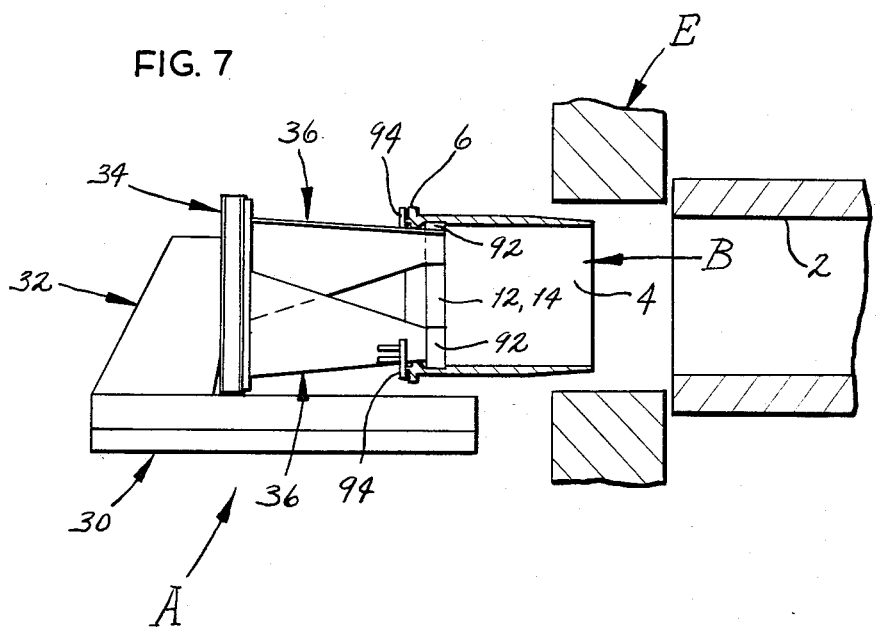

MACHINE FOR REMOVING ELECTRIC TRACTION MOTORS FROM WHEEL SPINDLES

BACKGROUND OF THE INVENTION

This invention relates in general to the servicing of electric motors used in the wheels of large automotive vehicles, and more particularly to a machine for extracting the electric motors from the spindles about which wheels of the vehicle revolve.

Some large off-the-road trucks of the type used at open pit mines are powered by diesel engines which drive generator sets which in turn are connected through heavy electrical cables to electric traction motors at the wheels of the vehicles. The electrical energy produced by the generators energizes the so-called motorized wheels, causing the wheels to turn and propel the vehicle.

The wheels themselves are quite large, having tires that in some instances measure in excess of 12 feet in diameter. The hubs of the wheels are likewise large and each revolves about a large spindle that is mounted on the chassis of the truck. The spindle houses the electric motor for the wheel, and the armature of the motor is connected to the wheel hub through a rather extensive gear train at the inboard end of the spindle. The motor alone may weigh as much as 6000 pounds.

The wheels and the spindle-housed motors which drive them are not easily serviced because of their size and weight. Moreover, the trucks themselves represent an extremely large capital investment, and must remain in operation as much as possible to justify the investment. Hence, many operators of these large off-the-road trucks prefer to replace an electric motor rather than attempt to repair the motor while it is on the truck, because replacement is usually less time consuming. Even so, the entire wheel must be removed to obtain access to the motor, and this in itself is a difficult and somewhat time consuming procedure.

SUMMARY OF THE INVENTION

One of the principal objects of the present invention is to provide a machine for extracting an electric motor from a so-called motorized wheel without removing the wheel itself from the vehicle. Another object is to provide a machine of the type stated in which the machine is mounted on and to a measure manipulated by a conventional fork lift truck. A further object is to provide a machine of the type stated that will not only extract the motor from the spindle in which it is housed, but further provides a means for carrying the motor, once it is extracted, to a desired nearby location. An additional object is to provide a machine of the type stated that withdraws the motor after only a minimum number of parts are removed and within a relatively short time. Still another object is to provide a machine of the type stated that is ideally suited for installing a new motor in the spindle about which the wheel revolves. Another object is to provide a process for quickly removing and installing an electric motor in the spindle of a vehicle. These and other objects and advantages will become apparent hereinafter.

DESCRIPTION OF THE DRAWINGS

In the accompanying drawings which form part of the specification and wherein like numerals and letters refer to like parts wherever they occur -

FIG. 6 is a schematic elevational view showing the arms of the machine aligned with and inserted into the magnet frame of the motor; and FIG. 7 is a schematic elevational view showing the arms of the machine gripping the magnet frame of the motor and supporting the motor after the motor is withdrawn from the spindle in which it is normally housed.

DETAILED DESCRIPTION

Figure 1:
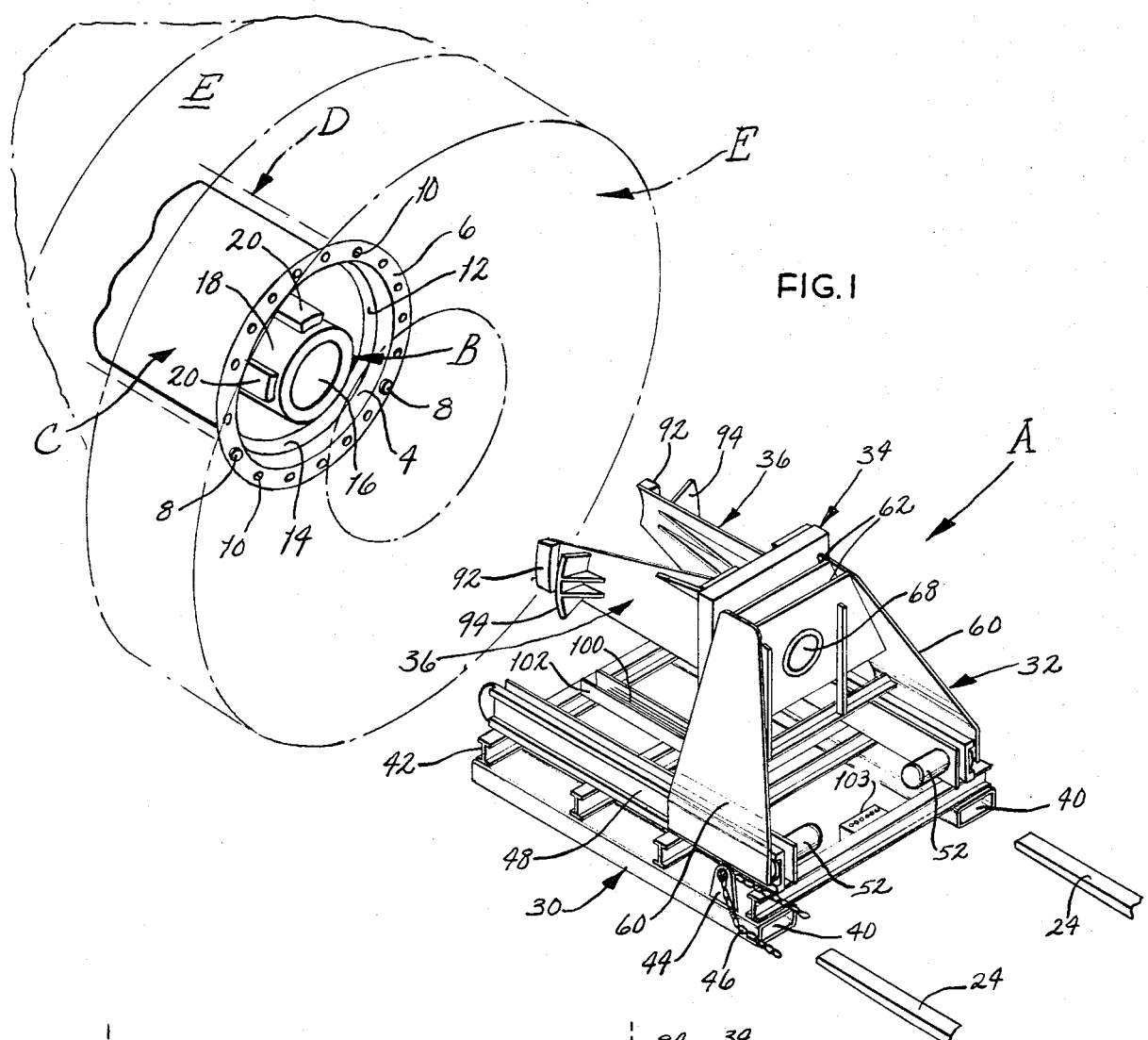
FIG. 1 is a perspective view showing the machine of the present invention and a wheel containing a motor which the machine is capable of extracting, the wheel being shown in phantom lines.

Referring now to the drawings, a machine A (FIG. 1) is suitable for servicing so-called motorized wheels on large off-highway vehicles, such as ore trucks, in that it will withdraw an electric motor B from a wheel spindle C in which the motor is housed or conversely will install a replacement motor B in the wheel spindle C. The wheel spindle C, which is a tubular structure, is mounted on the chassis of the truck, and a hub D to which a pair of wheels E is bolted, that is dual wheels E, revolves about the wheel spindle C on large tapered roller bearings. The motor B is connected to the wheel hub D through a gear train that is a the inboard end of the spindle C. A brake assembly is normally installed on the outboard end of the spindle C and is likewise connected with the hub. Thus to gain access to the motor B, the brake assembly must be removed, but in comparison to the motor B it is relatively light and easily detached from the spindle C.

The spindle C contains a bore 2 (FIGS. 6 & 7) which is in part tapered. The motor B is housed in the bore 2, it in effect being a large cartridge that may be moved as a unit into and out of the spindle bore 2. In this regard, the motor 2 has a case or magnet frame 4 (FIG. 1) which in itself is hollow and is tapered on its outer surface to conform to the slight taper of the spindle bore 2. The magnet frame 4 fits snugly into the spindle bore 2. At its large diameter end, the magnet frame 4 has a flange 6 which abuts against the outboard end of the spindle C when the magnet frame 4 is properly seated within the spindle bore 2, and indeed the magnet frame 4 and spindle C are joined firmly together by bolts 8 which extend through the flange 6 on the former and thread into the latter. In addition, the flange has several threaded bores 10 into which jack screws may be threaded to partially withdraw the motor B from the spindle C once the bolts 8 are removed.

Slightly inwardly from the flange 6, the magnet frame 4 has a machined surface 12 (FIGS. 1, 6, & 7) that is presented inwardly toward the axis of the frame 4 and is of a diameter greater than that of adjcaent internal surface areas of the frame 4 so as to provide a shallow recess 14 within the magnet frame 4. In addition to the magnet frame 4, the motor B includes an armature 16 (FIG. 1) which revolves in the magnet frame 4 and is at its inboard end connected through a gear train (not shown) to the wheel hub D that surrounds the spindle C. At its outboard end, the armature 16 is provided with a commutator 18 against which four brush assemblies 20 bear at 90° intervals, the brush assemblies 20 being supported on the magnet frame 4. The commutator 18 and brush assemblies 20 are located directly inwardly from the machined surface 14 and obstruct portions of that surface.

The extracting machine A is configured to be carried upon and maneuvered by a conventional fork lift truck having fork tines 24 (FIG. 1) that fit into the machine A. By manipulation of suitable controls on the truck, the tines 24 may be moved upwardly and downwardly, may be shifted laterally in both directions, and may be tilted forwardly and backwardly. These movements are effected through a hydraulic system on the truck, and that system has connections to which auxillary equipment may be attached. With the use of the fork lift truck, the machine A may be maneuvered into a position for engaging the magnet frame 4 with a grasp sufficient to withdraw the motor B from the spindle C and thereafter support the motor B when it is free of the spindle C. The machine A includes several basic components—namely (FIG. 1) a base frame 30 which receives the tines 24 of the fork lift truck, a carriage 32 which moves to and fro on the base frame 30, a rotatable head 34 that is mounted upon the carriage 32, and extractor arms 36 that project from the head 34 and into the space between adjacent brush assemblies 20 within the motor B to grasp the magnet frame 4 along its machined surface 14.

Figure 2:
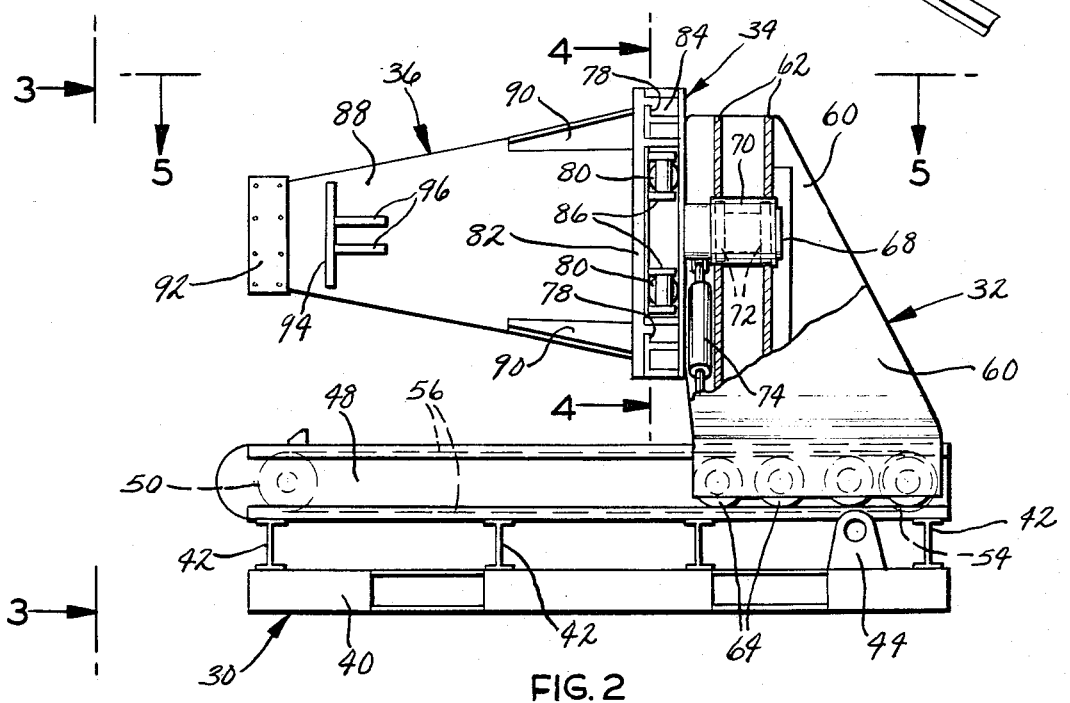
FIG. 2 is a side elevational view of the machine partially broken away to show interior components of its carriage.
Figure 3:
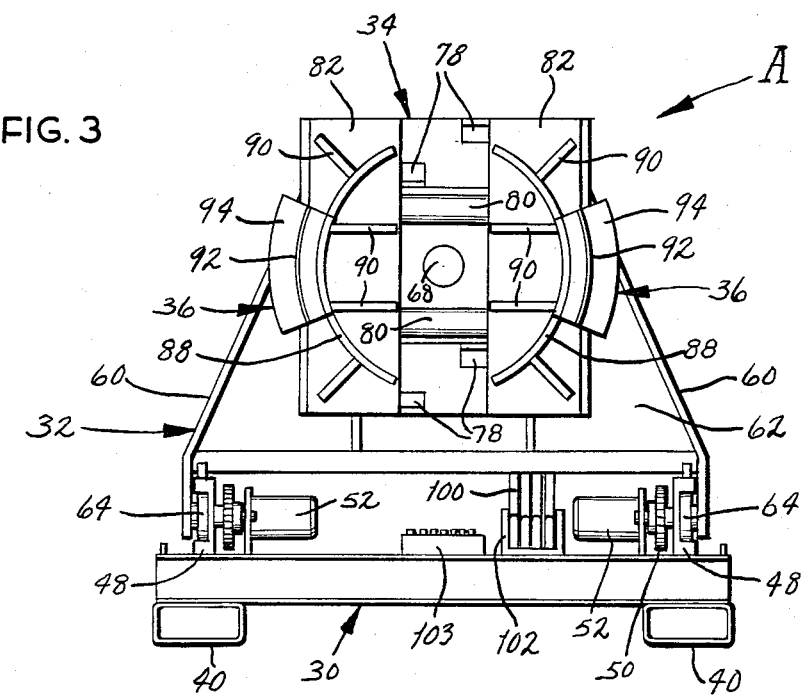
FIG. 3 is a front elevational view of the machine taken along line 3—3 of FIG. 2.
Figure 4:
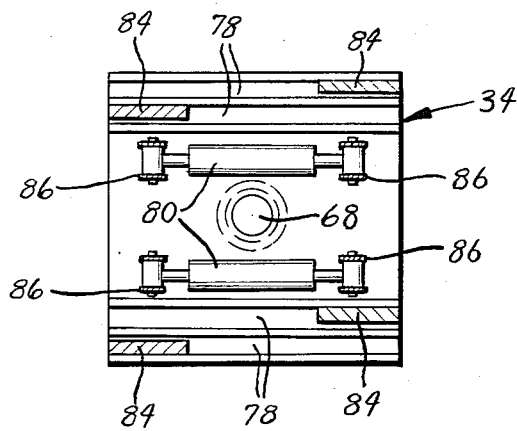
FIG. 4 is a sectional view taken along line 4—4 of FIG. 2 and showing the interior of the rotatable head on the machine.
Figure 5:
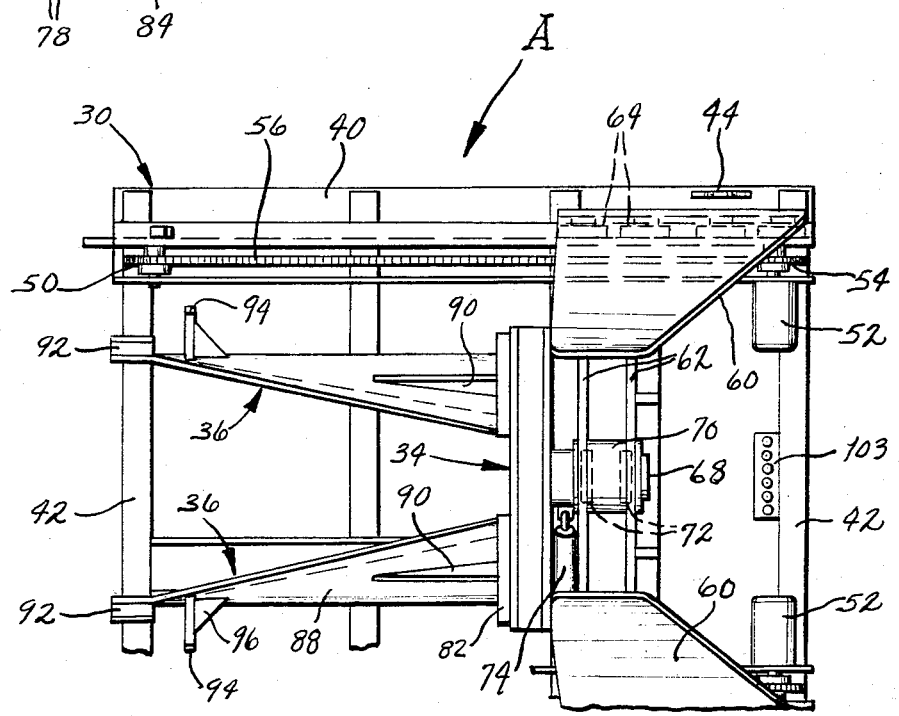
FIG. 5 is a plan view of the machine taken along line 5—5 of FIG. 2.

Beginning with the frame 30, it includes (FIGS. 2, 3, & 5) a pair of tubular members 40 which extend longitudinally and cross members 42 which extend between the two tubular members 40 and are further welded to the tubular members 40 at their ends such that the tubular members 40 are parallel to each other. The spacing between the tubular members 40 equals the spacing between the tines 24 of the fork lift truck, and moreover the interiors of the tubular members 40 are large enough to accommodate those tines. At the rear end of the frame 30 the ends of the tubular members 40 are open, and indeed the tines 24 are maneuvered into those open ends much in the same manner as they are maneuvered into the entry slots of a conventional pallet. Near their open ends, the tubular members 40 are provided with eyes 44 through which chains 46 are passed to secure the base frame 30 to th tines 24.

In addition to the members 40 and 42, the base frame 30 has tracks 48 which are welded to the cross members 42 directly above the tubular members 40, and each track 48 is in effect a channel that opens laterally, yet is closed at its ends. At the forward end of each track, the frame 30 is fitted with an idler sprocket 50, while at the rear end of the track 48 a hydraulic motor 52 is mounted on the frame 30. Each motor 52 drives a sprocket 54 that aligns with the idler sprocket 50 at the front of that track 48 on which it is positioned, and extended around each pair of sprockets 50 and 54 is a roller chain 56. The ends of each roller chain 56 are attached to the carriage 32, so that when the motors 52 are energized, the carriage 32 will move along the tracks 48 of the frame 30.

The carriage 32 itself consists of (FIGS. 2, 3, & 5) two side plates 60 which at their lower ends are located immediately outwardly from the tracks 48 on the frame 30. Above the tracks 48, the plates 60 converge, and these converging portions are joined together by a pair of parallel cross plates 62. The lower portions of the side plates 60, that is the portions located directly outwardly from the tracks 48, are fitted with rollers 64 that are received in the channels of tracks 48. Each side plate 60 has four rollers 64 on it, and the rollers 64 enable the carriage 32 to move smoothly along the tracks 48 while resisting a heavy load that in effect imparts an upsetting moment to the carriage 32. The two roller chains 46 are attached to the side plates 60 slightly inwardly from and above the roller 64.

The rotatable head 34 (FIGS. 2-5) is located in front of the two cross plates 62 on carriage 32, and indeed the head 34 has a rotator spindle 68 which extends rearwardly from the center of the head 34 into a sleeve 70 (FIGS. 2 & 5) containing a pair of indirectly mounted tapered roller bearings 72. The bearings 72 permit the head 34 to rotate relative to the carriage 32, and further transmit heavy radial and axial loads between the head 34 and carriage 32. The rotational movement of the head 34 is effected by a hydraulic rotator cylinder 74 which extends between the head 34 and one of the side plates 60 of the carriage 32, it being connected at one end to the head 34 near the spindle 68 and at the other end to the side plate 60. When the cylinder 74 extends, the head 34 turns in one direction, and when it retracts, the head 34 turns in the opposite direction. The stroke and position of the cylinder 74 should be such that the head 34 will turn at least 50° and preferably about 64°.

The head 34 has two sets of parallel tracks 78 (FIGS. 2-4), with one set being generally above the spindle 68 and the other generally below the spindle 68. All four of the tracks 78 are spaced outwardly from the spindle 68, being located quite close to the upper and lower margins of the rectangular head 34. The head 34 also carries two double ended hydraulic cylinders 80 (FIG. 4) which are parallel to the tracks 78, but are located inwardly from them so as to be quite close to the spindle 68. Each cylinder 80 includes a barrel, which is mounted to the head 34, and a pair of piston rods, which extend from and retract into the ends of the barrel. The piston rods of the two cylinders 80 are attached to the extractor arms 36 for moving those arms 36 toward and away from each other on the head 34.

Each extractor arm 36 includes (FIGS. 2, 3, & 5) a base plate 82 that is positioned in front of the head 34 and has a pair of slides 84 (FIGS. 2 & 4) welded to it. The slides 84 project rearwardly and engage the tracks 78 of one of the sets on the head 34, thereby enabling the arm 36 to move toward and away from the axis of rotation for the head 34. The slides 84, moreover, interlock with their respective tracks 78 so that the arms 36 cannot be pulled forwardly out of the head 34, and this enables the arms 36 to transmit a substantial pulling force as well as support a heavy weight at their ends. In addition, the base plate 82 of each arm 36 is provided with lugs 86 which likewise project rearwardly into the head 34, and it is by means of these lugs 86 that the piston rods of the two cylinders 80 are connected to the extractor arms 36 for moving the arms 36 toward and away from each other on the head 34.

Aside from its base plate 82, each extractor arm 36 also includes a curved extension 88 (FIGS. 2, 3, & 5) which is welded to the plate 82 and projects forwardly, tapering somewhat to a free end that is small enough to fit between two brush assemblies 20 within the motor B. The convex surface of the extension 88 is presented outwardly away from the axis of rotation for the head 34, and the radius of curvature for that surface is somewhat less than the radius of curvature for the machined surface 12 on the magnet frame 4 of the motor B. Moreover, the circumferential extent of the extension 88 is considerably greater at the base plate 82 than at the free end, so that the edges of the extension 88 converge toward the free end. Thus, the extension 88 possesses a generally tapered configuration. While the curvature of the extension 88 imparts substantial rigidity to it, the extension 88 is further reinforced with gussets 90 which are welded between the convex and concave surfaces of the extension 88 and the forward faces of the base plate 82.

At its free end, the extension 88 of each arm 36 carries a gripping pad 92 (FIGS. 2, 3, & 5) which is presented outwardly and is curved in a convex configuration. Indeed, the radius of curvature for the outwardly presented surface of the pad 92 corresponds to that of the machined surface 12 on the magnet frame 4 of the motor B. Actually, the pad 92 is a composite composed of a curved steel backing and an elastomeric covering which is presented outwardly. The width of the pad 92 is slightly less than the width of the machined surface 12, while the thickness of the pad 92 is somewhat greater than the depth of the recess 14 in which the machined surface 12 is located. Finally the circumferential extent of the pad 92 is less than the space between two adjacent brush assemblies 20 within the motor B. In short, the pad 92 is configured to fit into the space between any two adjacent brush assemblies 20 and to project into the recess 14 on the magnet frame 4 and contact the machined surface 12 at the base of the recess 14 (FIGS. 6 & 7).

Each extension 88 at its free end is also provided with a stop 94 (FIGS. 2, 3, & 5) which projects laterally away from the convex surface of the extension 88 and is oriented perpendicular to the axis of rotation for the head 34. The stop 94, which is reinforced by more gussets 96, is offset rearwardly from the pad 92 by a distance equalling the spacing between the flange 6 and the machined surface 12 on the magnet frame 4 of the motor B. The arrangement is such that when the stop 96 comes against the flange 6 on the magnet frame 4, the pad 92 that is ahead of it will align with and indeed be located immediately inwardly from the recess 14 and the machined surface 12 of the magnet frame 4 of the motor B (FIGS. 6 & 7). Thus, the stops 94 serve to locate the pads 92 of the two extractor arms 36 properly with respect to the magnet frame 4, that is to enable the pads 92 to project into the recess 14 and engage the machined surface 14 when the cylinders 80 are energized to spread the arms 36.

The hydraulic cylinder 74 for rotating the head 34 and the hydraulic cylinders 80 for extending and retracting the extractor arms 36 are connected to metal sheathed hydraulic lines 100 (FIG. 1) which are doubled back upon themselves in a trough 102 on the main frame 30. This enables the lines 100 to pay out of and fold into the trough 102 as the carriage 32 moves. The lines 100 that lead to the cylinder 74 and the cylinders 80 are, along with other hydraulic lines that lead to the hydraulic motors 52, connected to a hydraulic junction block 103, and by means of quick-connect couplings, the hydraulic system of the fork lift truck is connected to the lines 100 at the block 103, so that the pressurized fluid for operating the motors 52 and the cylinders 74 and 80 is derived from the truck. Moreover, the controls for directing the fluid to the motors 52 and cylinders 74 and 80 are on the truck. Thus, by manipulating controls on the fork lift truck, the carriage 32 may be extended or retracted on the frame 30, the head 34 may be rotated in either direction, and the extractor arms 36 may be spread apart or brought together. The extracting machines hydraulic system also consists of checking valves to lock the carriage 32, head 34, or extractor arms 36 in set positions, restrictor valves to adjust the speed of the head rotation and extractor arms lateral movement, and a flow divider valve to harmonize the two carriage drive motors 52.

OPERATION

To remove the motor B from the spindle C, a brake assembly and other equipment at the outboard end of the spindle C are removed. Indeed, enough equipment is removed to expose the interior of the magnet frame 4. Then, the bolts 8 are unthreaded from the spindle C and withdrawn from the flange 6 of the magnet frame 4. Next, jack screws 110 (FIG. 6) are threaded into the holes 10 in the flange 6 and turned down against the end face of the spindle C. The screws 110 break the tight fit between the magnet frame 4 and the tapered bore 2 of the spindle C and further move the motor B about two inches away from its normally seated position within the spindle C. Then the jack screws 110 are likewise removed.

With the motor B resting freely in the tapered bore 2 of the spindle C, the extracting machine A is maneuvered into a position where it can grasp the motor B and extract it completely from the spindle C, so that the motor B may be replaced with another motor. In particular, the fork lift truck is maneuvered to position the extracting machine A, which is supported on the tines 24 of the truck, opposite the open end of the motor B. To this end, the tines 24 may be shifted laterally as well as upwardly and downwardly with respect to the chassis of the truck and the truck yawed left or right, so by means of these three adjustments it is possible to align the free ends of the extractor arms 36 with the open end of the motor B.

Once the fork lift truck and the extracting machine A on it are properly positioned, the cylinders 80 are energized to bring the pads 92 at the free ends of the extractor arms 36 close enough together to fit through the flange 6 and into the hollow magnet frame 4 of the motor B. Moreover, the rotator cylinder 74 is energized to rotate the frame 34 and extractor arms 36 such that the free ends of the arms 36 align with the spaces between adjacent brush assemblies 20 within the motor B. This positions the arms 36 such that they may be moved forwardly into the magnet frame 4 of the motor B without interferring with the brush assemblies 20.

Indeed, once the arms 36 are properly positioned, the hydraulic motors 52 on the main frame 30 are energized to move the carriage 32 forwardly over the frame 30. As the carriage 32 advances, the pads 92 at the free ends of the arms 36 move into the hollow interior of the magnet frame 4, passing between adjacent brush assemblies 20 as they do. The arms 36 advance until the stops 94 on them come against the flange 6. When this occurs, the pads 92 will be located immediately inwardly from the machined surface 12 on the magnet frame 4, and will moreover align with the recess 14 in which the surface 12 is located (FIG. 6).

Next, the cylinders 80 are energized to spread the arms 36, and this brings the pads 92 into the annular recess 14 in which the machined surface 12 is located. The pads 92 are forced tightly against the machined surface 12, whereupon the two cylinders 80 are locked to maintain the pads 92 against the surface 12.

While the pads 92 of the extractor arms 36 tightly grip the motor B at the machined surface 12 on the magnet frame 4, the hydraulic motors 52 of the extracting machine A are again energized, this time to move the carriage 32 rearwardly over the frame 30. As the carriage 32 retracts, the extractor arms 36 pull the motor B from the bore 2 of the spindle C, and indeed withdraw the motor B to the extent that it is essentially free of the spindle C (FIG. 7). The fork lift truck is then driven backwardly to completely withdraw the motor B from the spindle C and wheels E. Moreover, the arms 36 continue to grip the motor B and support it once it is free of the spindle C.

The fork lift truck is then driven a short distance where the motor B is lowered onto a supporting surface. The arms 36 are freed from the motor merely by moving them together with the cylinders 80.

A replacement motor B is installed in the spindle C by a procedure which is essentially the reverse of the withdrawal procedure previously explained. However, the jack screws 110 are not employed. Instead, the magnet frame 4 of the motor B is seated in the tapered bore 2 of the spindle C merely by turning down the bolts 8.

This invention is intended to cover all changes and modifications of the example of the invention herein chosen for purposes of the disclosure which do not constitute departures from the spirit and scope of the invention.

What is claimed is:

1. The combination comprising:
   (a) a motor mounted in a surrounding tubular structure and including a stator and a rotor within the stator;
   (b) a machine for extracting the rotor and stator from the surrounding tubular structure, wherein:
      (1) the stator includes a hollow case that fits snugly in said tubular structure,
      (2) the stator having an open end exposed in said tubular structure and providing an annular recessed surface adjacent the open end,
      (3) the machine includes a carriage movable toward and away from said exposed open end of said stator,
      (4) a pair of extractor arms supported on said carriage and operable to move toward and away from each other.
      (5) said pair of extractor arms being provided with pads sized to engage in said annular recessed surface of said stator, and stops spaced from and fixed in position with respect to said pads and adapted to abut on said open end of said stator to locate said pads in alignment for engaging said annular recessed surface; and
   (c) power operated means on said machine for moving said pair of arms apart to position said pads against said annular recessed surface and to move said carriage axially from said surrounding tubular structure so that said motor may be withdrawn from said surrounding tubular structure.

* * * * *